(12) United States Patent
Ramon

(10) Patent No.: US 11,417,213 B2
(45) Date of Patent: Aug. 16, 2022

(54) COLLISION DETECTION SYSTEM FOR A CRASH GUARD

(71) Applicant: BOPLAN BVBA, Wevelgem (BE)

(72) Inventor: Xavier Ramon, Marke (BE)

(73) Assignee: BOPLAN BVBA

( * ) Notice: Subject to any disclaimer, the term of this patent is extended or adjusted under 35 U.S.C. 154(b) by 465 days.

(21) Appl. No.: 16/492,594

(22) PCT Filed: Mar. 9, 2018

(86) PCT No.: PCT/IB2018/051547
§ 371 (c)(1),
(2) Date: Sep. 9, 2019

(87) PCT Pub. No.: WO2018/163115
PCT Pub. Date: Sep. 13, 2018

(65) Prior Publication Data
US 2021/0142673 A1    May 13, 2021

(30) Foreign Application Priority Data

Mar. 9, 2017   (BE) .................................. 2017/5148

(51) Int. Cl.
*E01F 9/30* (2016.01)
*G08G 1/16* (2006.01)
*E01F 9/60* (2016.01)
*E01F 15/00* (2006.01)
*E01F 15/14* (2006.01)

(52) U.S. Cl.
CPC .............. *G08G 1/165* (2013.01); *E01F 9/30* (2016.02); *E01F 9/60* (2016.02); *E01F 15/003* (2013.01); *E01F 15/14* (2013.01); *E01F 15/141* (2013.01)

(58) Field of Classification Search
CPC ...................................................... G08G 1/165
See application file for complete search history.

(56) References Cited

U.S. PATENT DOCUMENTS 4,985,835 A * 1/1991 Sterler ................ B60R 21/0132
180/282
5,500,642 A * 3/1996 Battle ..................... E01F 9/629
40/608

(Continued)

FOREIGN PATENT DOCUMENTS

BE      1 029 985 A2   8/2000
DE   10 2011 089380 A1   6/2017

(Continued)

OTHER PUBLICATIONS

International Search Report and Written Opinion dated Jun. 20, 2018.

*Primary Examiner* — Qutbuddin Ghulamali
(74) *Attorney, Agent, or Firm* — Fresh IP PLC; Clifford D. Hyra; Aubrey Y. Chen

(57) ABSTRACT

A collision detection system (1) for detecting and assessing the state of a crash guard (2), comprising at least one crash guard (2), which is provided with a sensor for detecting a collision onto or against the said crash guard (2), wherein the said system comprises a processing unit, which is provided to assess, on the basis of the signals generated by the sensor, the effect of a collision on the crash guard (2) and, if necessary, to initiate an alarm signal.

10 Claims, 4 Drawing Sheets

(56) References Cited

U.S. PATENT DOCUMENTS

| | | | | |
|---|---|---|---|---|
| 5,797,623 A | * | 8/1998 | Hubbard | G01L 5/0052 |
| | | | | 73/769 |
| 2001/0028163 A1 | * | 10/2001 | Breed | G01F 23/2965 |
| | | | | 180/274 |
| 2016/0052473 A1 | * | 2/2016 | Debenham | B60R 21/0132 |
| | | | | 701/46 |

FOREIGN PATENT DOCUMENTS

| | | |
|---|---|---|
| EP | WO 2011/038764 A1 | 4/2011 |
| ES | 2 460 937 A2 | 6/2012 |

* cited by examiner

COLLISION DETECTION SYSTEM FOR A CRASH GUARD

This application claims the benefit of Belgian patent application No. BE2017/5148, filed Mar. 9, 2017, which is hereby incorporated by reference in its entirety.

FIELD OF THE INVENTION

This invention relates, on the one hand, to a collision detection system for detecting and assessing the state of a fixedly erectable crash guard, comprising at least one crash guard. The crash guard is preferably a rack protector, a safety barrier, a wheel stopper, a protective screen, a bollard or a column protector.

BACKGROUND

In industrial environments such as warehouses and logistic centres, forklifts are often used to manipulate goods. In order to protect pedestrian zones, racks, machinery, or other structural elements against a crash (collision, impact) with forklift trucks or other traffic, so-called crash protection devices or crash guards are installed. These are generally made of materials such as metal, plastic, or of a combination of the two.

The crash guards in question are designed to be able to withstand a specific maximum impact (collision) energy. Below this energy level, the system reacts elastically, whereby it returns to its original shape. Above this energy level, a (plastic) deformation will take place. This is illustrated by FIG. 1, which is a representation of a general stress-strain diagram for polymers. Those parts of the system which are subjected to load in the plastic zone will not immediately break or crack, but do lose their initial strength. This is not, however, always visually apparent. That is because a plastic deformation of a polymer can also occur internally without visible damage on the outside, or because the protective device is constructed such that it consists of internal and external elements, wherein a damaged internal element is not visible. This can lead to dangerous situations if an additional crash takes place on a damaged crash guard. Even with an impact below the designed maximum energy value, the crash guard can then break.

Typical examples from industry are reckless forklift truck drivers, who cause heavy crashes and do not always report these to their superior if there is no visible damage. They fail to realize, however, that, as a result of this crash, the crash guard has (often) suffered serious damage which can give rise to serious risks in the event of a following crash against, for example, bystanders or the elements to be protected.

From international patent publication WO 2011/038764, it is known to place a plurality of position sensors at defined positions in a vehicle and/or on one or more vehicle components in order thus to be able to determine whether an impact has occurred anywhere. Via the various sensors, it becomes possible to generate a three-dimensional image of the vehicle (or a vehicle component). If, as a result of, for example, an impact, the relative position of the various sensors with respect to one another changes, then this three-dimensional image will likewise change. By subsequently making the comparison with the original image, it is possible to determine where an impact has occurred. WO 2011/038764 also describes that vehicles can further be equipped with a number of additional sensors in order to obtain additional functions, such as, for example, an accelerosensor to register the number of rolls in the event of an accident, or a speed sensor to determine the speed of the vehicle. However, this patent publication describes only embodiments specifically for vehicles, which, because of their cost, will not directly be used for fixedly (statically) erected structures such as the collision detection system. Moreover, it is a complex system.

SUMMARY

The object of this invention is to provide a detection system which allows the users to be informed about the state of a specific crash guard.

The object of the invention is achieved by providing a collision detection system for detecting and assessing the state of a fixedly erectable crash guard, comprising at least one crash guard, wherein the said crash guard is provided with at most one sensor for registering an acceleration of the crash guard in order thus to detect a collision onto or against the said crash guard, and wherein the said system comprises a processing unit, which is provided to assess, on the basis of the signals generated by the sensor, the effect of a collision on the crash guard, and, if necessary, to initiate an alarm signal. Preferably, the processing unit is provided to register detected collisions.

In fixedly erectable structures, such as the crash guard in accordance with the invention, the (initial) acceleration is in normal usage circumstances "0". However, in the event of an impact (collision), the structure will undergo an acceleration, firstly positive and subsequently—when returning to the original position-negative. This leads to an acceleration profile which is translated by the processing unit (via an algorithm) into an impact expressed in Joules. This calculated value is then compared with the known limit (threshold) values of the structure (crash guard) which has been driven into.

The system according to this invention allows the collision (impact) event of a specific crash guard to be recognized, and thus, as it were, to make the non-visually apparent damage visible. The system is provided to register each crash and to calculate the seriousness thereof. By keeping record of the history of the crashes (collisions), it is also possible to plan preventive maintenance, so that the risk of a failing system is lessened.

In a preferential embodiment of the detection system according to the invention, the processing unit will calculate the impact energy (Ei) of a collision onto or against the crash guard on the basis of the registered acceleration and the time of the acceleration. In particular, an alarm signal is generated if the registered impact energy is higher than a preset value ($E_t$).

In a preferred embodiment of the collision detection system according to the invention, the signal generated by the sensor contains information on the place of the collision and the magnitude of the collision (impact energy). The impact energy of a crash can be measured and calculated with various sensors. In a preferential embodiment, the sensor is an accelerometer, a mechanical strain gauge or an optical sensor. Naturally, other known sensors suitable for determining the magnitude of a collision likewise fall within the scope of this invention.

According to a more preferential embodiment of the collision detection system in accordance with this invention, the assessment of a collision takes place during an assessment phase, wherein the assessment is made on the basis of at least the signals generated by the sensor and the properties of the material from which the protection device is made. Preferably, use is made of data which can be derived from the stress-strain diagram of the material from which the protection device is made. Furthermore, information and data from simulations and physical tests, wherein, for example, a certain mass is crashed at a certain velocity against a specific protection device, can be taken into account.

In one particular embodiment of the collision detection system according to the invention, the crash guard is a rack protector, a safety barrier, a wheel stopper, a protective screen, a bollard or a column protector.

Another subject of this invention relates to a method for detecting and assessing the state of a fixedly erectable crash guard, wherein a collision onto or against the crash guard is detected by means of at most one sensor for registering an acceleration of the crash guard, and wherein, by means of a processing unit, the effect of the collision on the crash guard is assessed and, if necessary, an alarm signal is initiated. The assessment of a collision is realized preferably during an assessment phase, wherein the assessment is made on the basis of at least the signals generated by the sensor and the properties of the material from which the crash guard is made.

The method according to this invention is in particular suitable for implementation on a collision detection system according to this invention.

BRIEF DESCRIPTION OF THE DRAWINGS

In order to further illustrate and indicate the properties and particularities of this invention, there now follows a more detailed description of the device and method according to the invention. Let it be clear that nothing in the hereinafter following description can be interpreted as a limitation of the protection, claimed in the claims, for this invention.

In this description, reference is made by means of reference numerals to the accompanying drawings, wherein.

DETAILED DESCRIPTION OF EMBODIMENTS

A solution for recognizing the impact event of a crash guard, and thus for making the invisible damage visible, is to place the collision (impact) detection system in accordance with this invention, which registers each crash and calculates the seriousness thereof.

Figure 2:
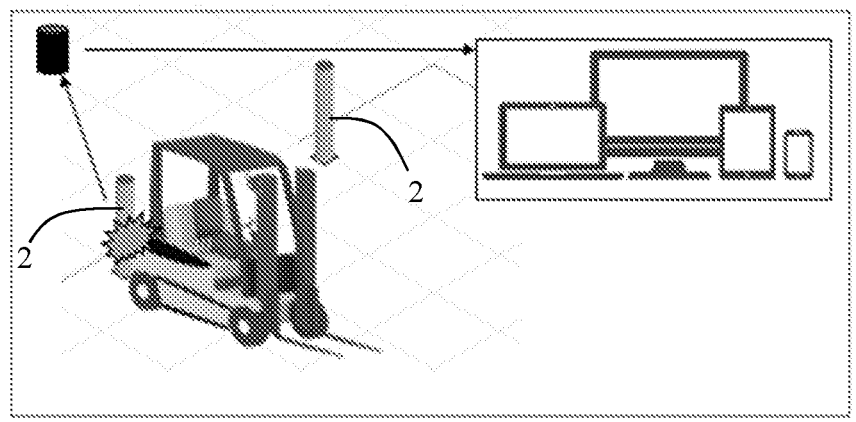
FIG. 2: is a schematic representation of a collision detection system according to the invention.
Figure 3:
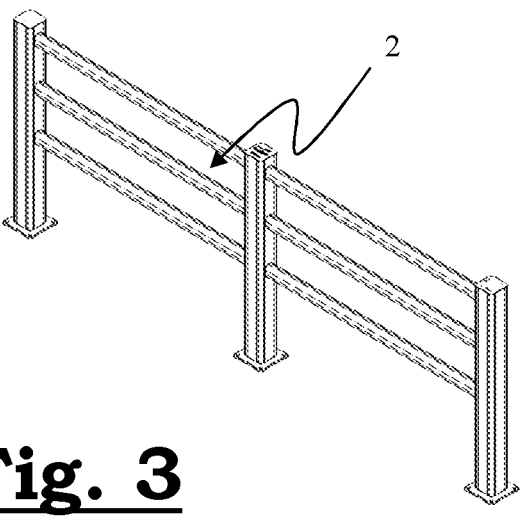
FIGS. 3 to 11: show a number of possible embodiments of a crash guard which can be used in the collision detection system according to the invention.
Figure 4:
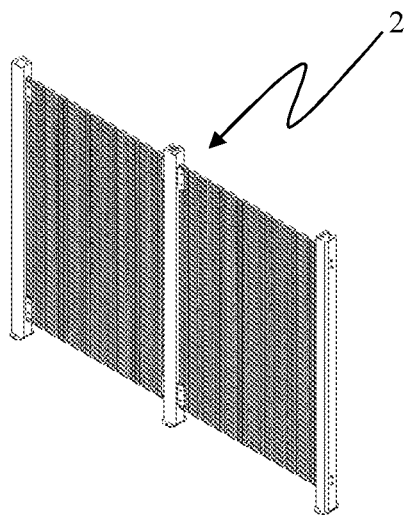

In accordance with this invention, the collision detection system (1) for detecting and assessing the state of a crash guard (2) and as represented schematically in FIG. 2 comprises at least one crash guard (2), which is provided with a sensor for detecting an acceleration on or against the said crash guard (2), wherein the said system (1) comprises a processing unit, which is provided to assess, on the basis of the signals generated by the sensor, the effect of a collision on the protection device (2) and, if necessary, to initiate an alarm signal.

The processing unit will calculate the impact energy (Ei) of a collision onto or against the crash guard on the basis of the registered acceleration and the time of the acceleration. An alarm signal is generated if the registered impact energy is higher than a preset value $(E_t)$.

Figure 1:
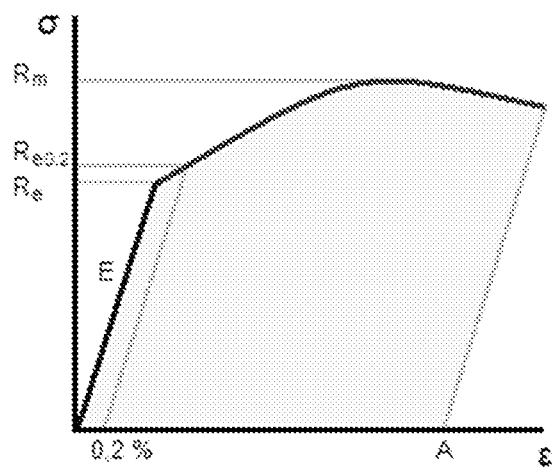
FIG. 1: is a representation of a general stress-strain diagram for polymers.

Non-critical crashes (thus with values in the elastic deformation zone in the stress-strain diagram—see FIG. 1) and critical crashes (values in the plastic deformation zone in the stress-strain diagram—see FIG. 1) are registered and recorded. Rules (values) are set up for each type of crash guard. These rules stipulate the behaviour which the collision detection system must exhibit in the event of a crash. Thus the system, for example, can generate an (alarm) signal in the event of a serious crash.

The processing unit makes use of an algorithm. The algorithm can be provided both in the processing unit and in the crash guard. This algorithm identifies the type of crash from the profile of the impact data. For this, the pattern of the acceleration during the period of the impact is looked at. In this way, a distinction can be drawn between a slow, but powerful crash and a brief crash. Both can lead to a critical impact, but have a completely different impact profile. A few parameters which are important in this context: the moment at which the acceleration becomes negative, the number of times that the acceleration changes successively from positive to negative, the duration of the various phases in the acceleration-time graph.

The algorithm (the processing unit) afterwards, as a function of the type of crash, translates the acceleration values into an impact value in Joules. This value is then compared with the threshold values which are determined for each product. Thus an evaluation is made of the seriousness of the crash.

Figure 5:
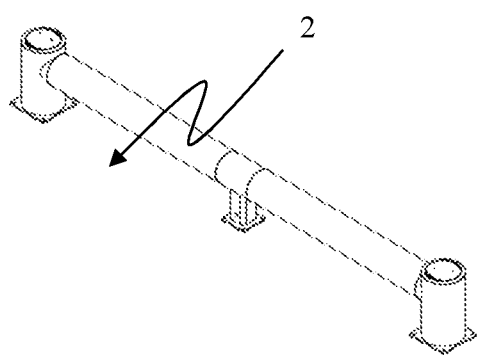
Figure 6:
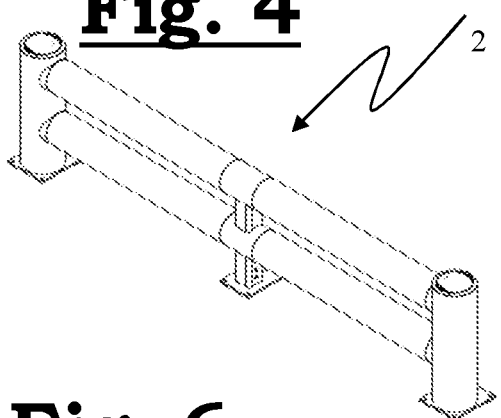
Figure 11:
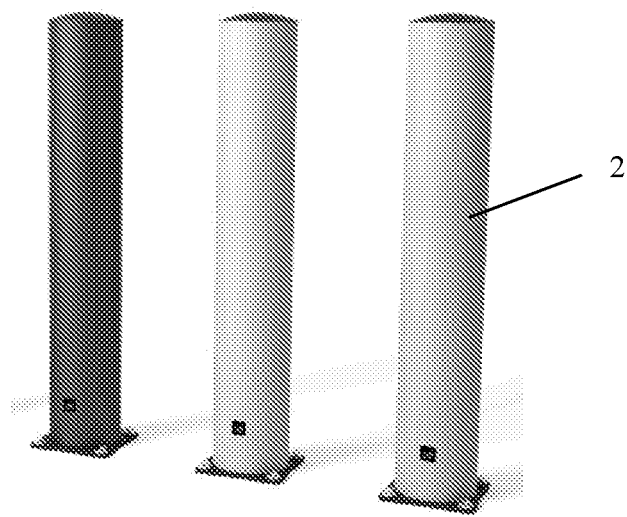

In this way, for example empirically, a number of threshold values were determined. Thus it was determined that the threshold value of the energy which the crash guard as shown in FIG. 5 can maximally absorb lies at 15,800 Joules. At higher values, the crash guard fails (breaks). If thus an impact occurs on this crash guard (2), in the case of the crash guard shown in FIG. 5 an alarm signal will thus be generated if the registered impact energy is higher than the set value of 15,800 Joules. In the case of the crash guard shown in FIG. 11, the maximum value before a break occurs lies at 3,200 Joules.

By keeping record of the history of the crashes, it is also possible to plan preventive maintenance, so that the risk of a failing system is lessened.

The impact energy of a crash can be measured and calculated with various sensors: an accelerometer, a mechanical strain gauge, an optical sensor, or similar sensor. Preference is given to an accelerometer.

In the case of an accelerometer, the measured acceleration values are dependent on the following parameters:
the mechanical construction;
the location of the sensor;
the material, or combination of materials, of the construction;
energy of the impact.

But these parameters are also crucial for the other sensors.

The measured values of acceleration (G-values) during (time t) the impact are used to calculate the energy $(E_i)$ of the impact.

By virtue of simulations and physical tests (with known vehicle speeds and masses), it is known what is the behaviour is of a specific protection device in the event of impact at various energy values $(E_t)$.

The comparison of $(E_i)$ and $(E_t)$ thus provides an evaluation of the seriousness of the crash, and thus also of the damage to the system.

An impact sensor is attached to a protection device (2). The fastening can be realized both on the inside or the inside. The data from the sensor are sent to a processing unit. The processing unit can be integrated or can be located at a distance from the protection device (2). The processed values are then sent to a read-out apparatus. This can be incorporated in the detection system, as well as be accommodated in the external processing unit, but can also be an external computer.

Figure 7:
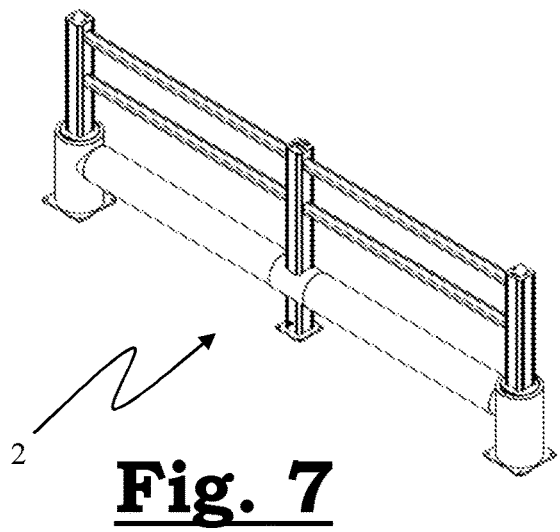
Figure 8:
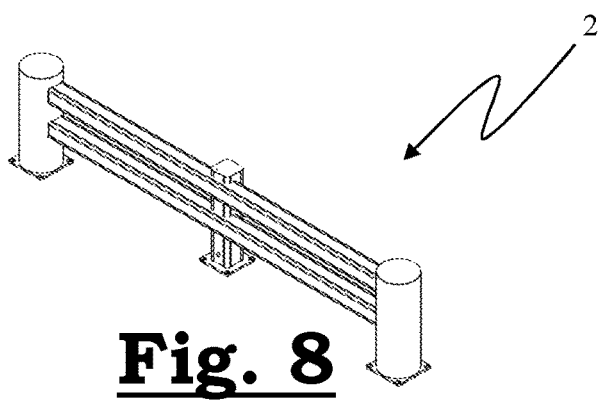
Figure 9:
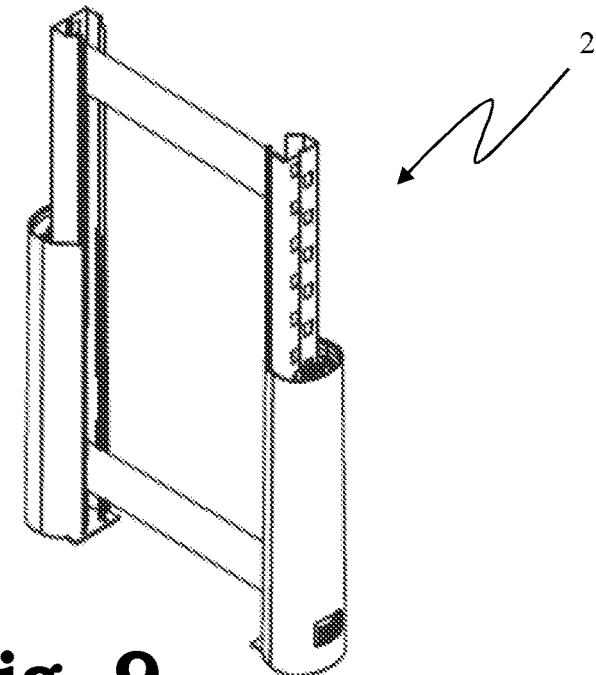
Figure 10:
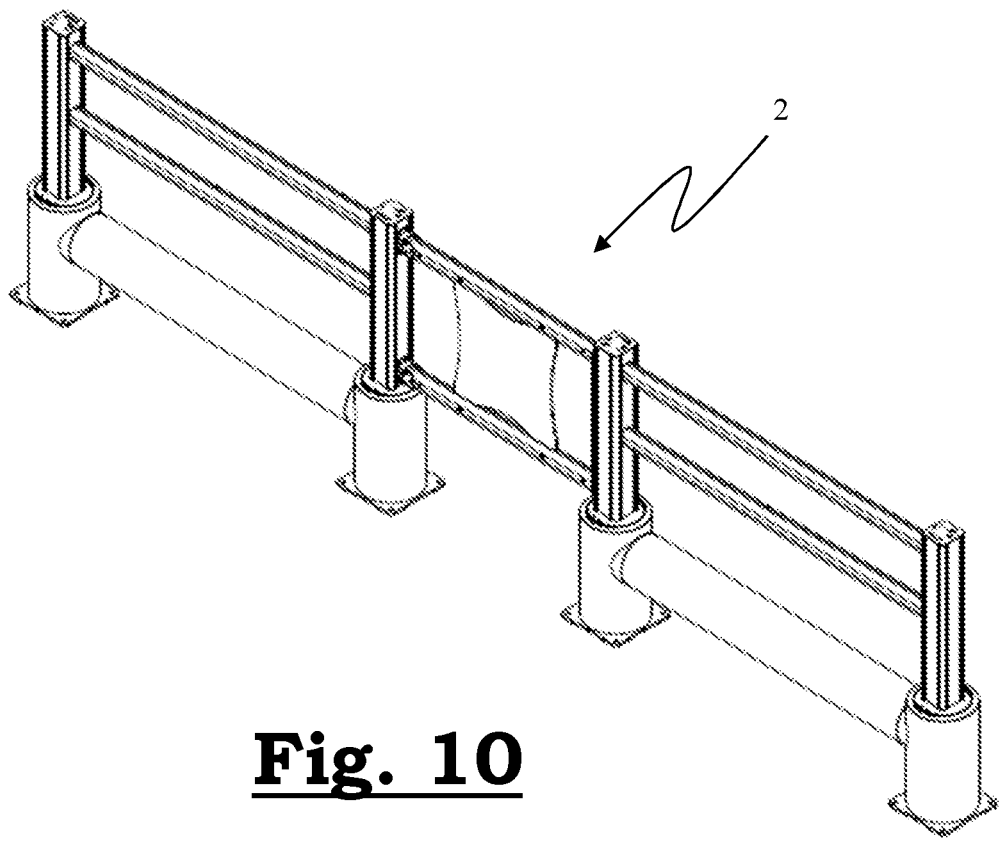

A sensor can be accommodated in various types of crash guards (2) (see FIGS. 3 to 11). Below, a non-limiting number of embodiments is briefly described:

safety barriers (FIG. 3): consisting of base plate, plastics vertical pole and plastics horizontal bars. The bars are fixed in the vertical pole. The base plate is fixed in the floor.

protective screens (FIG. 4): consisting of base plate, plastics vertical poles and plastics screens fixed to the vertical poles. The base plate is fixed in the floor.

single and double crash protection (FIGS. 5 and 6): consists of 'posts' and 'beams'. The posts consist of a base plate, on which is mounted a plastics tubular casing. Around this sits a second (outermost) tube. Between the two tubes sits an impact-absorbing element. The beams are mounted on the posts by means of a horizontal inner tube. The base plate is fixed in the floor.

crash protection and safety barriers combination: FIG. 7;

free-standing rack protection: (FIG. 8)

rack protection (FIG. 9): plastics shell which is fastened around a metal rack.

gates (FIG. 10): a hinged unit constructed from a combination of plastics and metal components.

protective portals;

free-standing protective poles (FIG. 11) analogous to a post.

column protectors: consist of two hollow plastics shells, which are placed one against the other.

wheel stoppers: solid rubber products.

The invention claimed is:

1. A collision detection system for detecting and assessing the state of a fixedly erectable crash guard, comprising:
at least one crash guard;
wherein the crash guard is provided with at most one sensor for registering an acceleration of the crash guard in order thus to detect a collision onto or against the said crash guard and, if necessary, to initiate an alarm signal;
wherein the system further comprises a processing unit configured to assess, on the basis of signals generated by the sensor, an effect of a collision on the crash guard, and
wherein the assessment is made based on (i) an impact energy (Ei) of a collision onto or against the crash guard, and (ii) a stress-strain diagram of one or more materials from which the crash guard is constructed.

2. The collision detection system according to claim 1, characterized in that the processing unit is configured to calculate the impact energy (Ei) of a collision onto or against the crash guard on the basis of the registered acceleration and a time of the acceleration.

3. The collision detection system according to claim 2, characterized in that an alarm signal is generated if the calculated impact energy is higher than a preset value (Et).

4. The collision detection system according to claim 1, characterized in that the processing unit is configured to register detected collisions.

5. The collision detection system according to claim 1, characterized in that the signal generated by the sensor contains information on the place of the collision and the magnitude of the collision.

6. The collision detection system according to claim 1, characterized in that the assessment of a collision takes place during an assessment phase, wherein the assessment is made on the basis of at least the signals generated by the sensor and properties of the material from which the crash guard is made.

7. The collision detection system according to claim 1, characterized in that the said sensor is an accelerometer, a mechanical strain gauge and/or an optical sensor.

8. The collision detection system according to claim 1, characterized in that the crash guard is selected from the group consisting of: a rack protector, a safety barrier, a wheel stopper, a protective screen, a bollard, or a column protector, and combinations thereof.

9. A method for detecting and assessing the state of a fixedly erectable crash guard, wherein a collision onto or against the crash guard is detected by means of at most one sensor for registering an acceleration of the crash guard, and wherein, by means of a processing unit, an effect of the collision on the crash guard is assessed and, if necessary, an alarm signal is initiated,
wherein the assessment is made based on (i) an impact energy (Ei) of a collision onto or against the crash guard, and (ii) a stress-strain diagram of one or more materials from which the crash guard is constructed.

10. The method according to claim 9, characterized in that the assessment of a collision takes place during an assessment phase, wherein the assessment is made on the basis of at least the signals generated by the sensor and properties of the material from which the crash guard is made.

* * * * *